(12) United States Patent
Liu et al.

(10) Patent No.: US 8,804,638 B2
(45) Date of Patent: Aug. 12, 2014

(54) METHOD AND USER EQUIPMENT FOR TRANSMITTING MULTIPLE A/N INFORMATION

(75) Inventors: Jianghua Liu, Beijing (CN); Mattias Wennstrom, Uppsala (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 314 days.

(21) Appl. No.: 13/175,548

(22) Filed: Jul. 1, 2011

(65) Prior Publication Data

US 2011/0274024 A1 Nov. 10, 2011

Related U.S. Application Data

(63) Continuation of application No. PCT/CN2009/075581, filed on Dec. 15, 2009.

(30) Foreign Application Priority Data

Jan. 4, 2009 (CN) .......................... 2009 1 0076433

(51) Int. Cl.
*H04W 4/00* (2009.01)
(52) U.S. Cl.
USPC .......................................................... 370/329
(58) Field of Classification Search
None
See application file for complete search history.

(56) References Cited

U.S. PATENT DOCUMENTS

| | | | |
|---|---|---|---|
| 2008/0025338 A1* | 1/2008 | Gorokhov | 370/441 |
| 2008/0095110 A1* | 4/2008 | Montojo et al. | 370/330 |
| 2008/0212506 A1 | 9/2008 | Lee et al. | |
| 2010/0329159 A1 | 12/2010 | Xia et al. | |

FOREIGN PATENT DOCUMENTS

| | | |
|---|---|---|
| CN | 101227231 A | 7/2008 |
| CN | 101227233 A | 7/2008 |
| CN | 101309132 A | 11/2008 |
| EP | 1533966 A2 | 5/2005 |

OTHER PUBLICATIONS

Written Opinion of the International Searching Authority issued in corresponding PCT Patent Application No. PCT/CN2009/075581, mailed Feb. 4, 2010.
International Search Report issued in corresponding PCT Patent Application No. PCT/CN2009/075581, mailed Feb. 4, 2010.
LG Electronics, "Bundled ACK/NACK in TDD", 7.1.2. 3GPP TSG RAN WG1#53, Kansas City, May 5-9, 2008. R1-081815.
$3^{rd}$ Generation Partnership Project; Technical Specification Group Radio Access Network; Evolved Universal Terrestrial Radio Access (E-UTRA); Physical Layer Procedures (Release 8). 3GPP TS 36.213, V8.5.0, Dec. 2008.

(Continued)

*Primary Examiner* — Minh-Trang Nguyen
(74) *Attorney, Agent, or Firm* — Brinks Gilson & Lione

(57) ABSTRACT

A method and a user equipment (UE) for transmitting multiple A/N information are provided. The method includes: determining reserved resources; determining A/N information that needs to be transmitted; and determining that the number of transmission resources is N (N is an integer greater than or equal to 2) and corresponding modulation symbols according to the number of the reserved resources and the A/N information that needs to be transmitted; and transmitting multiple A/N information by transmitting the modulation symbols by using the transmission resources. By transmitting multiple A/N information, a downlink frequency band where an error occurs can be correctly located. The A/N information includes acknowledgement (ACK) information, negative acknowledgement (NACK) information or Discontinuous Transmission (DTX) state information.

27 Claims, 9 Drawing Sheets

(56) References Cited

OTHER PUBLICATIONS

Office Action issued in corresponding Chinese Patent Application No. 200910076433.4, mailed Jul. 4, 2012.

Search Report issued in corresponding Chinese Patent Application No. 2009801531965, dated Feb. 6, 2013.

3GPP, LTE; Evolved Universal Terrestrial Radio Access (E-UTRA); Physical Layer Procedures (3GPP TS 36.213 version 8.8.0 Release 8), ETSI TS 136 213, Oct. 2009.

* cited by examiner

US 8,804,638 B2

METHOD AND USER EQUIPMENT FOR TRANSMITTING MULTIPLE A/N INFORMATION

CROSS-REFERENCE TO RELATED APPLICATIONS

This application is a continuation of International Application No. PCT/CN2009/075581, filed on Dec. 15, 2009, which claims priority to Chinese Patent Application No. 200910076433.4, filed on Jan. 4, 2009, both of which to priority is claimed and which are hereby incorporated by reference in their entireties.

FIELD OF THE INVENTION

The present invention relates to the field of wireless communications technologies, and in particular, to a method and a user equipment (UE) for transmitting multiple A/N information.

BACKGROUND OF THE INVENTION

A Hybrid Automatic Retransmission Request (HARQ) is a mechanism for improving the performance of a wireless communication system. On a downlink of the system, an application process of the HARQ is described as follows: A base station (BS) first sends a data block and control information related to the data block to a certain user; after correctly receiving the control information, the user checks the data block corresponding to the control information. If the check result is correct, an acknowledgement (ACK) is sent to the BS; after receiving the ACK, the BS regards that the data block is received by the corresponding user correctly, so a new data block can be sent to the user. If the check result is incorrect, the user sends a negative acknowledgement (NACK) to the BS; the BS re-transmits the sent data block to the user until the user returns ACK after correctly receiving the data block, or until the maximum re-transmission number is exceeded. In addition, if the user does not correctly receive the control information related to the data block, the user does not detect the data block or return the corresponding ACK or NACK on an uplink, so the user enters a Discontinuous Transmission (DTX) state. The BS knows that the user is in the DTX state through energy detection; at this time, the BS re-sends the data block and the control information.

In a 3rd Generation Partnership Project (3GPP) Long Term Evolution-Advanced (LET-A) Frequency Division Duplex (FDD) system, in order to support a wider system bandwidth, multiple frequency bands are supported simultaneously, which means spectrum aggregation, and data blocks are transmitted in every frequency band. For the data block transmitted in each downlink frequency band, the user needs to return a corresponding ACK or NACK, or enter the DTX state (which is referred to as returning an A/N/DTX in brief). It means that the user needs to return a plurality of A/N/DTXs in the uplink frequency bands. In a 3GPP LTE Time Division Duplex (TDD) system, downlink data is usually transmitted by multiple consecutive sub-frames. Referring to FIG. 13, the BS sends data blocks in multiple downlink sub-frames to a user, and in an uplink sub-frame, the user returns the A/N/DTX for the data block in each downlink sub-frame, which means that a plurality of A/N/DTXs needs to be returned in one sub-frame. In the existing 3GPP LTE TDD system, an A/N bundling method is used, that is to say, only one A/N is obtained after a logical AND operation on the A/N of each downlink sub-frame, and then the A/N is sent in an uplink sub-frame. In the bundling process, the DTX is regarded as a NACK.

SUMMARY OF THE INVENTION

During the implementation of the present invention, the inventors find that the prior art has at least the following problems: since a logical AND operation is used, when a transmission error occurs in one of multiple sub-frames, an A/N feedback obtained by a BS is a NACK. However, the BS cannot determine, according to the received NACK, in which sun-frame the error occurs. Therefore, the data in all sub-frames needs to be re-transmitted, which decreases the system transmission efficiency and throughput.

An embodiment of the present invention provides a method for transmitting multiple A/N information, where the method includes:

determining reserved resources;

determining A/N information that needs to be transmitted;

determining N transmission resources and corresponding modulation symbols according to the number of the reserved resources and the A/N information that needs to be transmitted, where N is an integer greater than or equal to 2; and transmitting the modulation symbols by using the transmission resources.

An embodiment of the present invention provides a UE, where the UE includes:

a module, configured to determine reserved resources;

a module, configured to determine A/N information that needs to be transmitted;

a module, configured to jointly select N transmission resources and corresponding modulation symbols according to the number of the reserved resources and the A/N information that needs to be transmitted; where N is an integer greater than or equal to 2; and a module, configured to transmit the modulation symbols by using the transmission resources.

An embodiment of the present invention provides a UE, where the UE includes:

a first determination module, configured to determine reserved resources;

a second determination module, configured to determine A/N information that needs to be transmitted;

a grouping module, connected to the first determination module and the second determination module, and configured to divide bits of the A/N information that needs to be transmitted into a first bit group and a second bit group according to the number of the reserved resources, and determine that the number of transmission resources is N;

an obtaining module, connected to the grouping module, and configured to obtain N transmission resources from the reserved resources according to the first bit group, and obtain the corresponding modulation symbols according to the second bit group; and a transmission module, connected to the grouping module and the obtaining module, and configured to transmit the modulation symbols by using the transmission resources.

In the embodiment of the present invention, N transmission resources and the corresponding modulation symbols are obtained according to the number of the reserved resources and the A/N information that needs to be transmitted, where N is an integer greater than or equal to 2. In this manner, multiple A/N information that needs to be transmitted is conveyed by the selected multiple transmission resources and modulation symbols, and therefore, multiple A/N information can be transmitted simultaneously. A BS can accurately know whether data block transmission in each downlink frequency band is correct, thereby accurately positioning the downlink frequency band where an error occurs, so as to reduce unnecessary re-transmission caused by the A/N bundling manner in the prior art. The A/N information includes ACK information, NACK information or DTX state information.

In addition, in the embodiment of the present invention, the bits of the A/N information that needs to be transmitted are divided into the first bit group and the second bit group. The transmission resources are obtained from the reserved resources according to the first bit group, and the corresponding modulation symbols are obtained according to the second bit group. Then the modulation symbols obtained from the second bit group are transmitted through the multiple transmission resources obtained according to the first bit group. In this manner, multiple A/N information that needs to be transmitted are conveyed by the selected multiple transmission resources and modulation symbols, and therefore multiple A/N information can be transmitted simultaneously. The BS can accurately know whether data block transmission in each downlink frequency band is correct or not, thereby accurately positioning the downlink frequency band where an error occurs, so as to reduce unnecessary re-transmission caused by the A/N bundling manner in the prior art.

In addition, in an embodiment of the present invention, multiple transmission resources can be transmitted by using the multi-antenna technology, that is, each antenna sends a transmission resource, and the transmission resources on different antennas can carry the same or different modulation symbols. In this manner, each antenna can ensure single-carrier transmission and further obtain a transmission diversity gain and spatial multiplexing gain of the multiple antennas.

DETAILED DESCRIPTION OF THE EMBODIMENTS

The details such as specific architectures, interfaces, and techniques in the following description are used to illustrate the present invention for a thorough understanding, and are not intended to limit the scope of the present invention. It is clear to persons skilled in the art that the present invention can also be implemented in other embodiments departing from these specific details. In other cases, detailed descriptions for well-known devices, circuits and methods are omitted in case that unnecessary details affect the illustration of the present invention. In addition, functional blocks are provided in some drawings. It should be understood by persons skilled in the art that these functions can be implemented through an independent hardware circuit, a digital microprocessor combining proper programming or software for general computer operating, an application-specific integrated circuit (ASIC) and/or one or more digital signal processors (DSPs).

The term UE in the embodiments of the present invention includes, but is not limited to, a mobile station, a UE, fixed or mobile subscriber unit, a fax, a wireless phone, a personal digital assistant (PDA), a computer or other types of UE that can work in a wireless environment. The term BS in the embodiments of the present invention includes but is not limited to a BS, an eNB, a Node B, a station controller, an access point (AP), or other types of equipment that can work in the wireless environment and interact with the preceding UE.

The technical solutions of the present invention are further described in the following through the drawings and embodiments.

Figure 1:
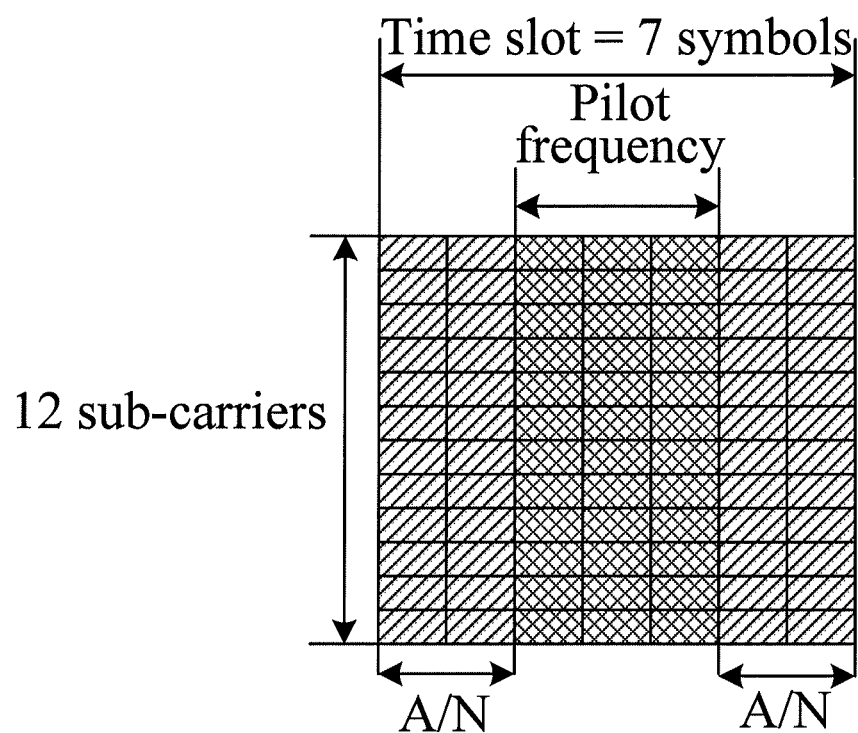
FIG. 1 is a schematic diagram of a resource block of a Physical Uplink Control Channel (PUCCH) according to an embodiment of the present invention.

In the embodiments of the present invention, when a BS (eNB) sends a data block and a related control signaling to a UE in a downlink, assuming that the control signaling is received correctly, the UE returns a corresponding A/N to the eNB in a PUCCH according to whether a check for the data block is correct or not. If the control signaling is not received correctly, the UE is in a DTX state, which means that the UE does not send anything. The PUCCH performs transmissions in two time slots of a sub-frame, where the PUCCH includes multiple resource blocks. Each resource block occupies 12 consecutive sub-carriers on a frequency domain, and occupies 6 or 7 symbols on a time domain. The number of symbols occupied by a resource block on the time domain is relevant to the length of a cyclic prefix. In a normal cyclic prefix, 7 symbols are occupied; and in an extended cyclic prefix, 6 symbols are occupied. The following discussion is based on the assumption that a resource block occupies 7 symbols. A/Ns of a user are transmitted in two resource blocks of the PUCCH, where the two resource blocks are located in different time slots. The resource block in the second time slot repeats data of the first resource block. FIG. 1 is a schematic diagram of a resource block of a PUCCH according to an embodiment of the present invention. Referring to FIG. 1, in a resource block for transmitting A/Ns, 3 symbols are used to transmit demodulation pilot, and the remaining 4 symbols are used to transmit the A/Ns.

In a resource block of the PUCCH, A/Ns of different users are multiplexed through code division, where codes of different users are orthogonal to distinguish different users. The A/N of each user is generally a Binary Phase Shift Keying (BPSK) or a Quadrature Phase Shift Keying (QPSK) symbol. If the user only has one codeword (or transmission block) in the downlink, the A/N of only 1 bit is required; at this time, the A/N is a BPSK symbol. If the user has two code words in the downlink, that is, Multiple Input Multiple Output (MIMO) is used, and it is required that the A/N of two bits corresponds to two code words, respectively. At this time, the two A/N bits are modulated into a QPSK symbol. This modulation symbol (BPSK or QPSK) is mapped onto the resource block shown in FIG. 1 after spreading. A sequence used in the spreading is a two-dimensional orthogonal spreading code. The spreading code in the frequency domain is a sequence with the length of 12, and altogether 12 different sequences exist; the spreading code in the time domain is a orthogonal sequence with the length of 4, and altogether 3 different sequences exist. The 12 sequences on the frequency domain are obtained through phase rotation of a basic sequence, that is, $r^{\alpha}(n)=e^{j2\pi n\alpha/12}r(n)$, $n=0, 1, \ldots, 11; \alpha=0, 1, \ldots, 11$, where $r(n)$ represents the basic sequence with the length of 12, and $r^{\alpha}(n)$ represents a sequence obtained after the phase rotation of the basic sequence. The 3 quadrature sequences with the length of 4 exist on the time domain, as shown in Table 1.

TABLE 1

| Sequence number β | [w(0) w(1) w(2) w(3)] |
|---|---|
| 0 | [1 1 1 1] |
| 1 | [1 −1 1 −1] |
| 2 | [1 −1 −1 1] |

Figure 2:
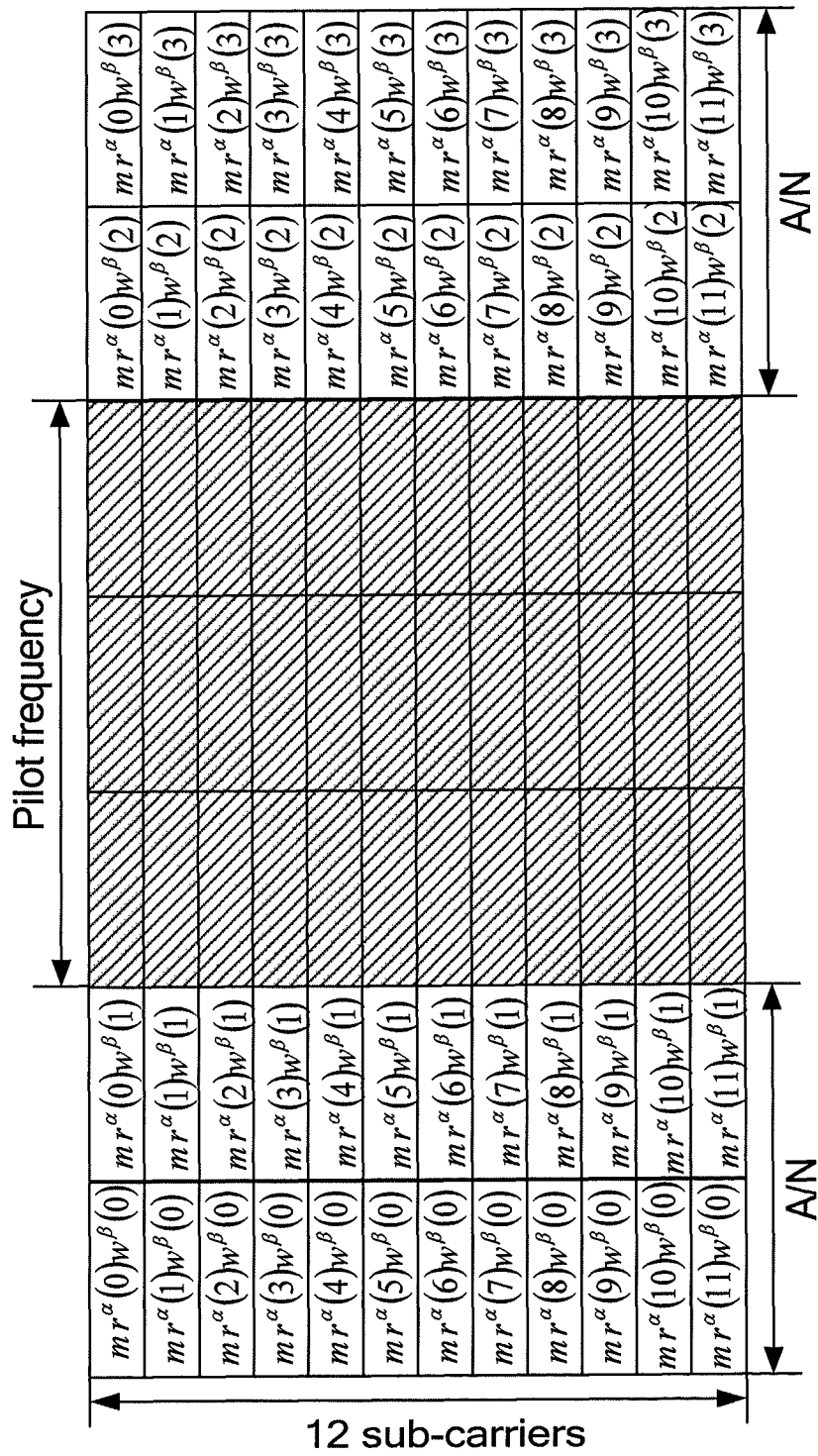
FIG. 2 is a schematic structural diagram showing the sending of an A/N according to another embodiment of the present invention.

FIG. 2 is a schematic structural diagram showing the sending an A/N according to another embodiment of the present invention. Referring to FIG. 2, a modulation symbol m corresponding to an A/N of a user is mapped into 4 A/N symbols in a resource block after two-dimensional spreading of time domain and frequency domain sequences. The frequency domain sequence used is $r^{\alpha}(n)$, and the sequence used in the time domain is $w^{\beta}(n)$. FIG. 2 may include 36 pilots at most for selection, and may support 36 users at most.

A resource block includes 12 sequences in the frequency domain, and 3 sequences in the time domain, and therefore has 36 sequence combinations, namely 36 two-dimensional spreading sequences. All users transmitting A/Ns in a same resource block use different sequences in the 36 two-dimensional spreading sequences. Referring to Table 2, the 36 two-dimensional spreading sequences can be numbered by K as follows.

TABLE 2

| Frequency domain sequence number | Time domain sequence number | | |
|---|---|---|---|
| | 0 | 1 | 2 |
| 0 | K = 0 | K = 12 | K = 24 |
| 1 | K = 1 | K = 13 | K = 25 |
| 2 | K = 2 | K = 14 | K = 26 |
| 3 | K = 3 | K = 15 | K = 27 |
| 4 | K = 4 | K = 16 | K = 28 |
| 5 | K = 5 | K = 17 | K = 29 |
| 6 | K = 6 | K = 18 | K = 30 |
| 7 | K = 7 | K = 19 | K = 31 |
| 8 | K = 8 | K = 20 | K = 32 |
| 9 | K = 9 | K = 21 | K = 33 |
| 10 | K = 10 | K = 22 | K = 34 |
| 11 | K = 11 | K = 23 | K = 35 |

In some specific channel conditions, for example, a channel with strong frequency selectivity, only 6 sequences of the 12 sequences in the frequency domain can be used, and one sequence exists between two frequency domain sequences. In this manner, 18 two-dimensional spreading sequences can be generated. Referring to Table 3, the 18 sequences can be numbered as follows:

TABLE 3

| Frequency domain sequence number | Time domain sequence number | | |
|---|---|---|---|
| | 0 | 1 | 2 |
| 0 | K = 0 | | K = 12 |
| 1 | | K = 6 | |
| 2 | K = 1 | | K = 13 |
| 3 | | K = 7 | |
| 4 | K = 2 | | K = 14 |
| 5 | | K = 8 | |
| 6 | K = 3 | | K = 15 |
| 7 | | K = 9 | |
| 8 | K = 4 | | K = 16 |
| 9 | | K = 10 | |
| 10 | K = 5 | | K = 17 |
| 11 | | K = 11 | |

When transmitting the A/N in the PUCCH, the user needs to select a two-dimensional spreading sequence K, and obtain a corresponding frequency domain spreading sequence and time domain spreading sequence according to K to send the A/N by using the selected spreading sequences. A process for the user to obtain the required K is described below.

When the eNB transmits the data block to the user, a PDCCH is transmitted to instruct at which resource block the data block of the user is located, as well as the control signaling such as a modulation coding manner and a precoding matrix used in the transmission. The control signaling is the above mentioned control signaling related to the transport block. The user first detects the PDCCH; if the PDCCH is detected, the transmitted data block is demodulated according to contents instructed by the PDCCH. For dynamically scheduled users, each user has a PDCCH. A PDCCH is formed by 1, 2, 4 or 8 CCEs. The number of CCEs of a PDCCH is relevant to the size of the control signaling contents and channel quality of the user. For example, if the channel quality of a user is poor, in order to improve the performance of the PDCCH, 8 CCEs are used to transmit the PDCCH of the user. At this time, a low coding bit rate is used in the PDCCH of the user to resist the fading of the channel.

Figure 3:
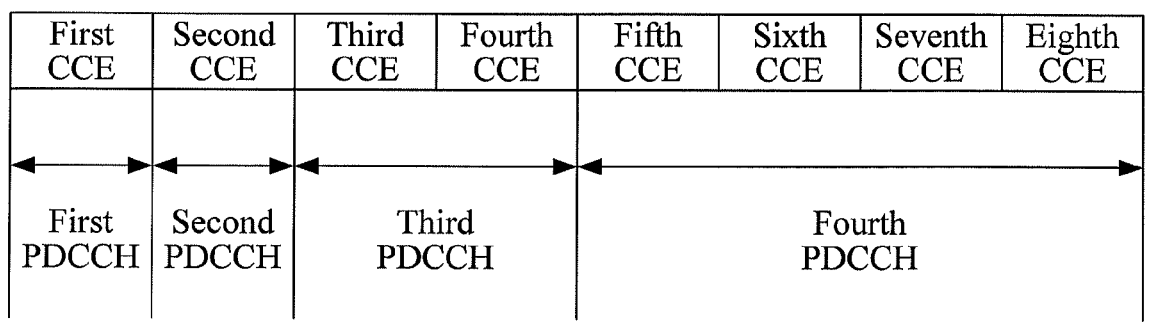
FIG. 3 is a schematic diagram of a mapping relationship between a Packet Data Control Channel (PDCCH) and a Control Channel Element (CCE) according to another embodiment of the present invention.

FIG. 3 is a schematic diagram of a mapping relationship between a PDCCH and a CCE according to another embodiment of the present invention. Referring to FIG. 3, altogether four users are involved; each user corresponds to one PDCCH, and the four PDCCHs are respectively a first PDCCH, a second PDCCH, a third PDCCH, and a fourth PDCCH. The first PDCCH and the second PDCCH each includes one CCE, that is, the first PDCCH includes a first CCE and the second PDCCH includes a second CCE; the third PDCCH includes two CCEs (a third CCE and a fourth CCE); and the fourth PDCCH includes four CCEs (a fifth CCE, a sixth CCE, a seventh CCE, and an eighth CCE).

The two-dimensional spreading sequence K that the user uses to return the A/Ns is determined by the location of the first CCE of the PDCCH of the user. A start CCE of each user PDCCH is different, and therefore, different two-dimensional spreading sequences K can be determined. In a word, the K and the start CCE of the PDCCH can share a fixed relationship, which is not described in detail herein. It is assumed that $K=N_{index\ of\ first\ CCE}+4$, so:

user 1: K=0+4=4
user 2: K=1+4=5
user 3: K=2+4=6
user 4: K=4+4=8

Then, the frequency domain sequence and the time sequence of the sent A/N can be obtained according to the mapping relationship between the number K of the two-dimensional spreading sequence and the time and frequency sequences, for example, Table 2, Table 3 or other similar tables (it is determined according to the specific channel conditions whether to use Table 2, Table 3 or other similar tables). According to the mapping relationship in Table 2, user 2 uses the $5^{th}$ frequency domain sequence and the $1^{st}$ sequence of the time domain. It can be seen from the above that K=7 will not be used by other users, since the CCEs corresponding to K=7 are occupied by the PDCCH of user 3, indicating that user 3 can actually use 2 two-dimensional spreading sequences, that is, the user corresponds to M CCEs, which indicates that M two-dimensional spreading sequences can be used.

The LTE-A system supports users to transmit data by using multiple downlink frequency bands or uplink frequency bands at the same time; in this way, users can use a wider bandwidth to transmit data. The multiple frequency band transmission is a main characteristic of the LTE-A system; however, this characteristic also causes some problems. When receiving the downlink data, a user cannot exactly know in which frequency bands the eNB transmits data to the user; therefore, the user needs to constantly detect whether each frequency band includes the data to be transmitted to the user, which results in high power consumption.

In order to reduce the power consumption of users, a main downlink frequency band is defined for each user; a corresponding signaling is transmitted in the primary downlink frequency band to instruct whether data is transmitted in downlink frequency bands other than the primary downlink frequency band. The primary downlink frequency bands of different users may be different. For example, altogether 3 downlink frequency bands exist in the system, which respectively are frequency band 1, frequency band 2, and frequency band 3; then, frequency band 1, frequency band 2, and frequency band 3 can be defined as the primary downlink frequency bands of user 1, user 2, and user 3. After the primary downlink frequency band is defined, each user first detects whether the primary downlink frequency band includes data that the user needs to receive, and then determines whether to detect other downlink frequency bands according to the signaling received in the main downlink frequency band. If the primary downlink frequency band instructs that no data is transmitted in other frequency bands, the user does not need to detect other sub-frequency bands; if the primary downlink frequency band instructs that data is transmitted in other frequency bands, the user detects the data in a specified frequency band, so that unnecessary detection is avoided. Similarly, when the user transmits data in the uplink, if the data that needs to be sent to the eNB is not much, the data does not need to be always sent on multiple sub-frequency bands, and may be sent only in a primary uplink frequency band. In this manner, for each user, the primary downlink frequency band and the primary uplink frequency band constitute a pair of primary frequency bands.

When data blocks are transmitted to a certain user in multiple downlink frequency bands, the user needs to return an A/N for the data block transmitted in each downlink frequency band, and therefore the number of the A/Ns that need to be returned is relevant to the number of the downlink frequency bands used. The multiple A/Ns are sent in the primary uplink frequency band of the user. For example, the system includes three downlink frequency bands and two uplink frequency bands, which are respectively downlink frequency band 1, downlink frequency band 2, downlink frequency band 3, uplink frequency band 1, and uplink frequency band 2. The downlink frequency band 1 and uplink frequency band 1 are defined as the primary frequency band pair of the user 1. The downlink frequency band 2 and uplink frequency band 2 are defined as the primary frequency band pair of the user 2. If data is transmitted to user 1 and user 2 in all three downlink frequency bands, both user 1 and user 2 return A/Ns on the primary uplink frequency band of each respectively.

Figure 4:
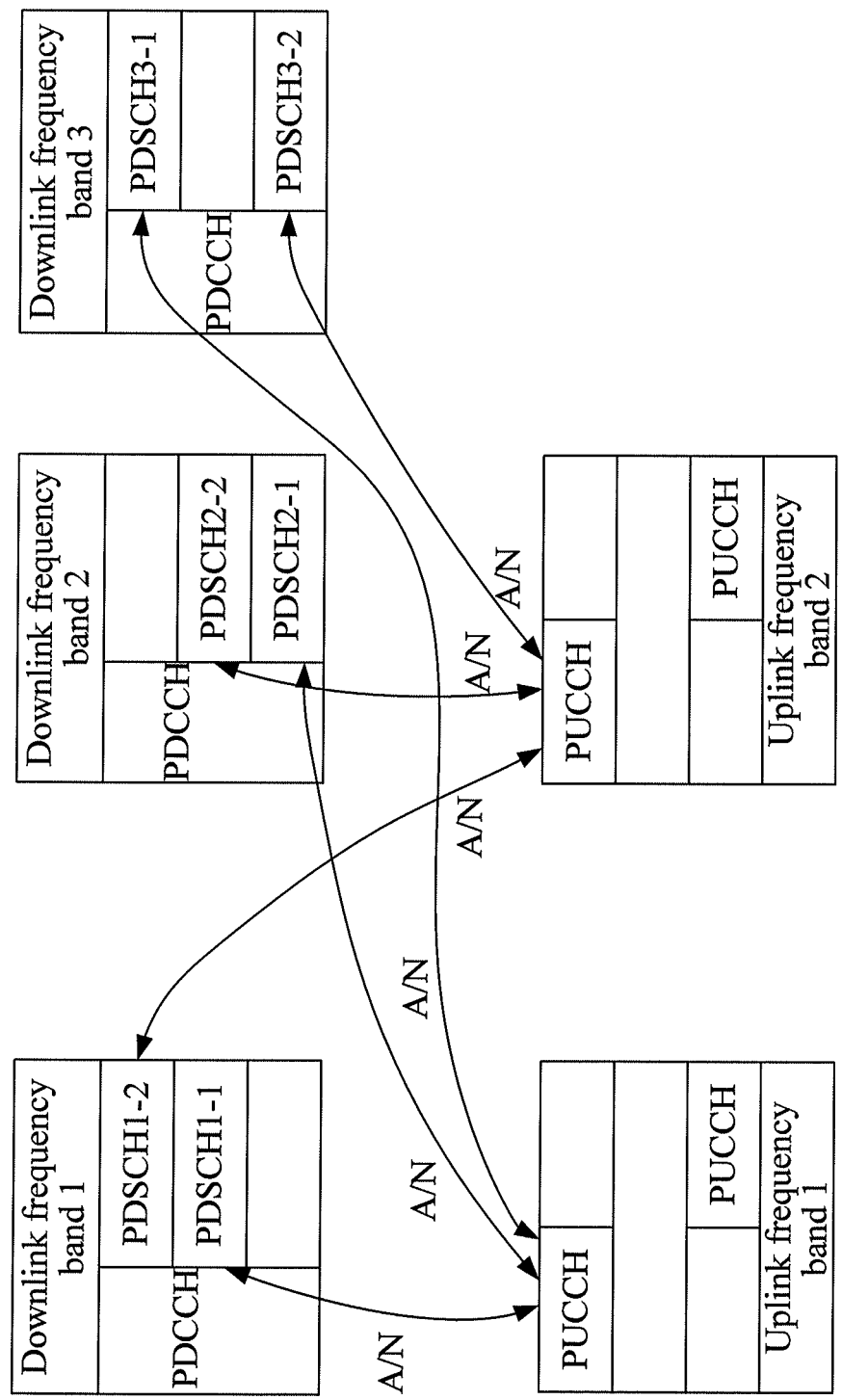
FIG. 4 is a schematic diagram of a mapping relationship between an uplink and a downlink according to another embodiment of the present invention.

FIG. 4 is a schematic diagram of a mapping relationship between an uplink and a downlink according to another embodiment of the present invention. Referring to FIG. 4, a Physical Downlink Shared Channel (PDSCH)i-j represents transmission of a data block to a jth user on an ith downlink frequency band.

Figure 5:
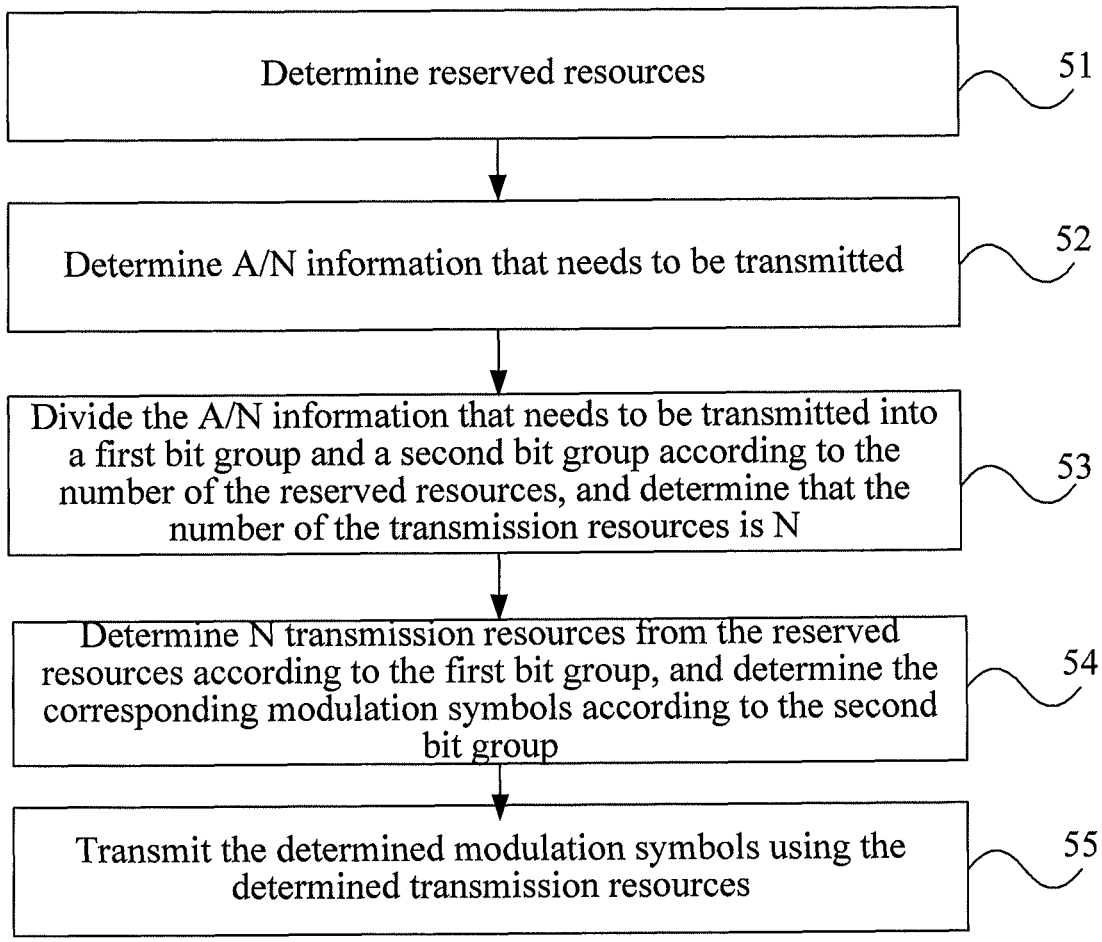
FIG. 5 is a schematic flowchart of a method according to another embodiment of the present invention.

FIG. 5 is a schematic flow chart of a method according to another embodiment of the present invention, which includes the following steps.

In Block 51, a UE determines reserved resources. The reserved resources and transmission resources involved herein may be time, frequencies, codes, sequences, antennas, and so on. The reserved resources and transmission resources being sequences is taken as an example below.

According to the preceding analysis, in order to avoid unnecessary detection, a BS usually transmits a data block of a user on a main downlink frequency band of the user. While in the preceding description of the sequence, it can be understood that the number of the sequences used in an uplink frequency band is the same as the number of CCEs for the user in a PDCCH of the corresponding downlink frequency band. Therefore, the number of the CCEs included in the PDCCH of the primary downlink frequency band of the user may be selected as the number of the reserved resources. For example, if the PDCCH of the primary downlink frequency band of the user includes M CCEs, the number of the reserved resources is M. Besides, based on the relationship between the CCE and the sequence, the reserved resources of the user can be obtained according to the CCE corresponding to the user (for example, the reserved resources can be obtained according to a relationship between the start location of the CCE and a sequence K).

In another situation, a downlink frequency band set is defined for each user. Different users can have the same or different downlink frequency band sets. A data block and a corresponding PDCCH for each user can be sent in at least one frequency band in the downlink frequency band set corresponding to the user. The downlink frequency band of each user can include a part of or all of the downlink frequency bands. In this manner, when receiving downlink data, the user needs to perform PDCCH detection on each downlink frequency band in the downlink frequency band set, and demodulate a transmission block according to a result of the PDCCH detection. In this case, every downlink frequency band may have the PDCCH.

Of course, if the data of the user is sent to the user in multiple downlink frequency bands, and each downlink frequency band carries the PDCCH for the user, the number of the reserved resources may also be the total number of the CCEs included in the PDCCHs of the downlink frequency bands corresponding to the user. For example, the BS transmits the data blocks to the user in downlink frequency band 1 and downlink frequency band 2, where the PDCCH of downlink frequency band 1 includes M1 CCEs, and downlink frequency band 2 includes M2 CCEs; then the number of the reserved resources is M=M1+M2. The reserved resources obtained according to the CCEs included on the primary downlink frequency band are taken as an example below.

The preceding reserved resources are all obtained indirectly according to the PDCCH; of course, the reserved resources may also be assigned by the BS explicitly, for example, assigned explicitly through a higher layer signaling in a semi-static state manner or through a dynamic signaling. Further, the reserved resources may be a combination of the explicit assignment and indirect assignment, for example, the reserved resources may be obtained indirectly through the PDCCH and explicitly through the higher layer signaling.

After the reserved resources are determined, N resources of the M reserved resources can be selected as transmission resources, where N is a number from 1 to M−1.

In Block 52, the UE determines A/N information that needs to be transmitted.

Specifically, A/N information corresponding to codewords included in each downlink frequency band is bundled respectively, that is, the "AND" operation is performed on the A/Ns of each downlink frequency band. After the logic AND operation, only one A/N is obtained, thereby obtaining the A/N information that needs to be transmitted corresponding to each downlink frequency band. Alternatively, the A/N information corresponding to the codewords included in each downlink frequency band is used as the A/N information that needs to be transmitted, thereby obtaining the A/N information that needs to be transmitted corresponding to each codeword. For example, if the number of the downlink frequency bands is 4, and each downlink frequency band includes 2 codewords, altogether 8 bits of the A/N information exist. If it is determined that the 8-bit A/N information is too much according to conditions of the reserved resources, transmission resources, and modulation symbols, for instance, the number of the reserved resources is 4; the number of the transmission resources is 2; and the modulation symbols are QPSK symbols, which means that only 2 bits are required for instructing the transmission resources, 4 bits at most are required for instructing the modulation symbol, and the remaining 2 bits fail to characterize the information of the transmission resources or modulation symbols. Then the logic AND operation can be performed on two A/Ns of each downlink frequency band to obtain 4-bit A/N information. When the performance of the system is capable of transmitting 8 bits, the 8 bits can be directly used as the number of bits of the A/N information that needs to be transmitted.

If the user does not know the number of PDCCHs transmitted from the BS in the downlink frequency band, the number of the PDCCHs correctly received by the user may be smaller than the number of the PDCCHs sent by the BS. For example, for a specific user, the BS sends a PDCCH respectively in each of the three downlink frequency bands. It is assumed here that each PDCCH corresponds to a data block. However, at a receiving end, the user only correctly receives two PDCCHs; then the user regards that the BS only sends two PDCCHs and two data blocks, and only returns A/Ns for the two data blocks in an uplink PUCCH.

In another situation, the user knows the number of the PDCCHs transmitted from the BS in the downlink frequency bands; at this time, the number of the A/Ns returned by the user in the uplink PUCCH is equal to the number of the PDCCHs. For example, a user knows that the BS sends two PDCCHs in the downlink frequency bands, and each PDCCH corresponds to a data block. However, if only one PDCCH is correctly detected at the receiving end, the user regards that the other PDCCH is not detected correctly. At this time, the user returns the A/N in the uplink for the data block corresponding to the correctly received PDCCH, and returns a DTX for the data block corresponding to the PDCCH that is not correctly received; at this time, the feedback information is (A/N, DTX).

In Block 53, the UE divides the A/N information that needs to be transmitted into a first bit group and a second bit group according to the number of the reserved resources, and determines that the number of the transmission resources is N.

Specifically, the bit number m1 of the first bit group can be determined according to the number M of the reserved resources and the number N of the transmission resources, where $2^{m1} \leq C_M^N$. The bit number m2 of the second bit group can be obtained according to the bit number m of the A/N information that needs to be transmitted and the bit number m1 of the first bit group, where m2=m−m1. For example, if M=4, and N=2, then m1 can be selected as 1 or 2 (according to actual configuration requirements). After that, it is obtained that m2=m−m1.

For example, the reserved resources are 4 sequences, namely, S1, S2, S3, and S4; the A/N that needs to be transmitted is 4-bit information, namely A/N(0), A/N(1), A/N(2), and A/N(3); and it is determined that the number of the transmission resources is 2, namely two transmission sequences. Then, the 4-bit A/N information that needs to be transmitted can be divided into two groups, namely [A/N(0), A/N(1)] and [A/N(2), A/N(3)], where the group [A/N(0), A/N(1)] is used for selecting two transmission sequences among four sequences, and the group [A/N(2), A/N(3)] is used for modulating a QPSK symbol, as shown in the following table.

TABLE X-1

| A/N(1)A/N(2) | (S1, S2) | (S1, S3) | (S1, S4) | (S2, S3) |
|---|---|---|---|---|
| 00 | ✓ | | | |
| 01 | | ✓ | | |
| 10 | | | ✓ | |
| 11 | | | | ✓ |

TABLE X-2

| A/N(3)A/N(4) | QPSK modulation symbol |
|---|---|
| 00 | $Q_0 = \dfrac{1+j}{\sqrt{2}}$ |
| 01 | $Q_1 = \dfrac{1-j}{\sqrt{2}}$ |
| 10 | $Q_2 = \dfrac{-1+j}{\sqrt{2}}$ |
| 11 | $Q_3 = \dfrac{-1-j}{\sqrt{2}}$ |

If Table X-1 and Table X-2 are combined, that is, the transmission sequence and the modulation symbol are jointly selected by using [A/N(1)A/N(2)A/N(3) A/N(4)], a mapping relationship can be obtained as shown in Table X-3.

TABLE X-3

| A/N(1)A/N(2)A/N(3) A/N(4) | Sequence | Modulation symbol |
|---|---|---|
| 0000 | (S1, S2) | $Q_0 = \frac{1+j}{\sqrt{2}}$ |
| 0001 | (S1, S2) | $Q_1 = \frac{1-j}{\sqrt{2}}$ |
| 0010 | (S1, S2) | $Q_2 = \frac{-1+j}{\sqrt{2}}$ |
| 0011 | (S1, S2) | $Q_3 = \frac{-1-j}{\sqrt{2}}$ |
| 0100 | (S1, S3) | $Q_0 = \frac{1+j}{\sqrt{2}}$ |
| 0101 | (S1, S3) | $Q_1 = \frac{1-j}{\sqrt{2}}$ |
| 0110 | (S1, S3) | $Q_2 = \frac{-1+j}{\sqrt{2}}$ |
| 0111 | (S1, S3) | $Q_3 = \frac{-1-j}{\sqrt{2}}$ |
| 1111 | (S1, S4) | $Q_0 = \frac{1+j}{\sqrt{2}}$ |
| 1000 | (S1, S4) | $Q_1 = \frac{1-j}{\sqrt{2}}$ |
| 1110 | (S1, S4) | $Q_2 = \frac{-1+j}{\sqrt{2}}$ |
| 1011 | (S1, S4) | $Q_3 = \frac{-1-j}{\sqrt{2}}$ |
| 1001 | (S2, S3) | $Q_0 = \frac{1+j}{\sqrt{2}}$ |
| 1100 | (S2, S3) | $Q_1 = \frac{1-j}{\sqrt{2}}$ |
| 1010 | (S2, S3) | $Q_2 = \frac{-1+j}{\sqrt{2}}$ |
| 1101 | (S2, S3) | $Q_3 = \frac{-1-j}{\sqrt{2}}$ |

By comparing Table X-1 and Table X-2 with Table X-3, it is easy to conclude that Table X-3 is based on the same idea, solves the same technical problem, and brings the same technical effect as Table X-1 and Table X-2. Therefore, specifically, the second bit group can be empty, namely m2=0, and m1=m. More specifically, no A/N information includes the DTX.

Alternatively, the A/N information that needs to be transmitted includes the DTX.

In Block 54, the UE determines N transmission resources from the reserved resources according to the first bit group, and determines the corresponding modulation symbols according to the second bit group.

Specifically, when the second bit group is empty, the UE also obtains the N transmission resources from the reserved resources and the modulation symbols according to the A/N information of the first bit group.

In Block 55, the UE transmits the determined modulation symbols by using the determined transmission resources.

The transmission methods of the present invention are described through the following embodiments with different transmission resources (the sequence may be taken as an example) and different modulation symbols (the QPSK may be taken as an example).

In Mode 1, the UE includes only one antenna, and the antenna transmits one sequence. The sequence transmits one modulation symbol. It is assumed that 2 downlink frequency bands transmit data to the user, and each downlink frequency band includes two codewords. The PDCCH of the main downlink frequency band is formed by 4 CCEs. Then 4 sequences (M=4) are reserved in the primary uplink frequency band (namely the number of the reserved resources). The sequences are S1, S2, S3 and S4 respectively (namely the reserved resources). It is assumed that N transmission sequence needs to be selected (N=1); then the transmission resource is S1, S2, S3 or S4. The number of bits of the A/N information that needs to be transmitted is 4 (m=4), and the A/N information is A/N (1), A/N (2), A/N (3) and A/N (4) respectively. The bits, of which m=4, are divided into two parts: a first bit group [A/N(1) A/N(2)], of which m1=2, and a second bit group [A/N(3) A/N(4)], of which m2=m−m1=2. The transmission sequence which selects N=1 in the reserved sequences is obtained according to the first bit group [A/N (1) A/N (2)], and the modulation symbol is obtained according to the second bit group [A/N (3) A/N (4)]. For the relationship between the first bit group and the transmission sequence, references can be made to Table 4. For the relationship between the second bit group and the modulation symbol (QPSK symbol), references can be made to Table 5.

TABLE 4

| A/N(1) A/N(2) | S1 | S2 | S3 | S4 |
|---|---|---|---|---|
| 00 | ✓ | | | |
| 01 | | ✓ | | |
| 10 | | | ✓ | |
| 11 | | | | ✓ |

TABLE 5

| A/N(3) A/N(4) | QPSK Symbol |
|---|---|
| 00 | $Q_0 = \frac{1+j}{\sqrt{2}}$ |
| 01 | $Q_1 = \frac{1-j}{\sqrt{2}}$ |
| 10 | $Q_2 = \frac{-1+j}{\sqrt{2}}$ |
| 11 | $Q_3 = \frac{-1-j}{\sqrt{2}}$ |

Figure 6:
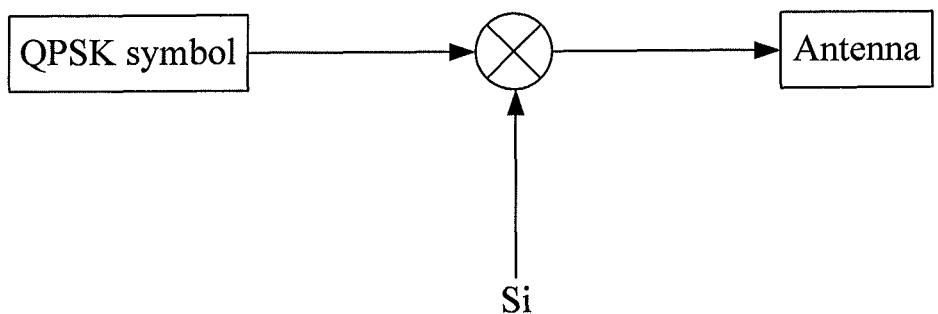
FIG. 6 is a schematic diagram showing the sending of sequences and symbols of a UE according to another embodiment of the present invention.

FIG. 6 is a schematic diagram showing the sending of sequences and symbols according to another embodiment of the present invention. Referring to FIG. 6, after a transmission sequence Si and a QPSK symbol are obtained by referring to Table 4 and Table 5 according to the bits of the A/N information that needs to be transmitted, the sequence is sent through an antenna of the system, and the QPSK symbol is transmitted in the sequence. For example, for a user, when A/N(1)=1, A/N(2)=0, A/N(3)=0, and A/N(4)=1, then the transmission sequence obtained according to Table 4 is S3; the QPSK modulation symbol obtained according to Table 5 is Q1. After that, Q1 is sent through the antenna through the S3 sequence. The BS performs the detection after receiving a feedback signal, and the BS detects that the Q1 is sent in the S3. Further, the BS can obtain [[A/N(1) A/N(2)]=[1 0], [A/N(3) A/N(4)]=[0 1] according to the corresponding relationships in Table 4 and Table 5. When the A/N is 1, it indicates correct transmission, and when the A/N is 0, it indicates incorrect transmission. Besides, during the negotiation with a terminal, the BS knows in advance that A/N(1), A/N(2), A/N(3) and A/N(4) respectively correspond to a first codeword of a first downlink frequency band, a second codeword of the first downlink frequency band, a first code word of a second downlink frequency band, and a second code word of the second downlink frequency band. Therefore, the BS can know that the second codeword of the first downlink frequency band and the first codeword of the second downlink frequency band are transmitted incorrectly. The BS can re-transmit the second codeword of the first downlink frequency band and the first codeword of the second downlink frequency band only, and does not need to re-transmit all code words of all frequency bands.

In Mode 2, the UE includes only one antenna, and the antenna transmits multiple sequences; the multiple sequences transmit different modulation symbols. It is assumed that 3 downlink frequency bands transmit data to the user, and each downlink frequency band includes two codewords. The PDCCH of the main downlink frequency band is formed by 4 CCEs. 4 sequences are reserved on the primary uplink frequency band (M=4), and the sequences are S1, S2, S3 and S4 respectively. It is assumed that 2 transmission sequences need to be selected (N=2). Then the number of bits of the A/N information that needs to be transmitted is 6 (m=6), and the A/N information is A/N (1), A/N (2), A/N (3), A/N (4), A/N (5) and A/N (6) respectively. The bits, of which m=6, are divided into two parts: a first bit group [A/N(1) A/N(2)], of which m1=2, and a second bit group [A/N(3) A/N(4) A/N(5) A/N(6)], of which m2=m−m1=4. The transmission sequences which select N=2 in the reserved sequences are obtained according to the first bit group [A/N (1) A/N (2)], and two modulation symbols are obtained according to [A/N (3) A/N (4)] and [A/N(5) A/N(6)] of the second bit group. For the relationship between the first bit group and the transmission sequence, references can be made to Table 6. For the relationship between the second bit group and the modulation symbol (QPSK symbol), references can be made to Table 5.

TABLE 6

| A/N(1)A/N(2) | (S1, S2) | (S1, S3) | (S1, S4) | (S2, S3) | (S2, S4) | (S3, S4) |
|---|---|---|---|---|---|---|
| 00 | ✓ | | | | | |
| 01 | | ✓ | | | | |
| 10 | | | | ✓ | | |
| 11 | | | | | | ✓ |

Figure 7:
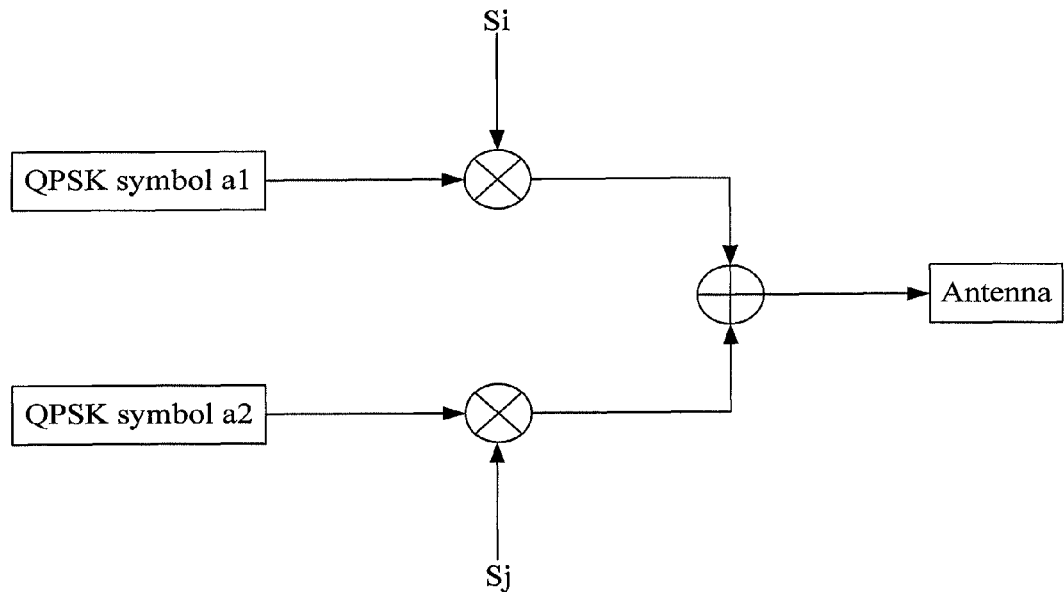
FIG. 7 is a schematic diagram showing the sending of sequences and symbols of a UE according to another embodiment of the present invention.

FIG. 7 is a schematic diagram showing the sending of sequences and symbols according to another embodiment of the present invention. Referring to FIG. 7, after transmission sequences Si and Sj, and QPSK symbols a1 and a2 are obtained through referring to Table 6 and Table 5 according to the bits of the A/N information that needs to be transmitted, the two sequences are sent through an antenna of the system, and one QPSK symbol is transmitted in each sequence. For example, for a user, if A/N(1)=0, A/N(2)=1, A/N(3)=1, A/N (4)=0, A/N(5)=1, and A/N(6)=1, then the transmission sequences obtained according to Table 6 and corresponding to [A/N(1),A/N(2)]=[0 1] are (S1, S3); the first QPSK modulation symbol a1 obtained according to Table 5 and modulated based on [A/N(3),A/N(4)]=[1 0] is Q2; and the second QPSK modulation symbol a2 obtained according to Table 5 and modulated based on [A/N(5),A/N(6)]=[1 1] is Q3. After that, different modulation symbols are respectively mapped to different sequences, for example, the a1 is mapped to the S1, and the a2 is mapped to the S2. Then, two sequences transmitting the modulation symbols are sent through one antenna after being added, that is, two sequences are modulated to one antenna. After receiving the feedback signal, the BS performs the detection, and detects that the sequences (S1, S3) include the modulation symbols, and that the two modulation symbols are Q2 and Q3 respectively. The BS can obtain [A/N(1) A/N(2)]=[0 1], [A/N(3) A/N(4)]=[1 0], and [A/N(5) A/N(6)]=[1 1] according to the mapping relationship between the transmission sequence and the modulation symbol, and of Table 6 and Table 5. When the A/N is 1, it indicates the correct transmission, and when the A/N is 0, it indicates the incorrect transmission. Besides, during negotiation with the terminal, the BS knows in advance that A/N(1), A/N(2), A/N(3), A/N (4), A/N(5) and A/N(4) respectively correspond to a first code word of a first downlink frequency band, a second code word of the first downlink frequency band, a first code word of a second downlink frequency band, a second code word of the second downlink frequency band, a first code word of a third downlink frequency band, and a second code word of the third downlink frequency band. Therefore, the BS can know that the first code word of the first downlink frequency band and the second code word of the second downlink frequency band are transmitted incorrectly. The BS can re-transmit the first code word of the first downlink frequency band and the second code word of the second downlink frequency band only, and does not need to re-transmit all code words of all frequency bands.

In Mode 3, the UE includes multiple antennas, and each antenna transmits one of multiple transmission sequences obtained. The multiple sequences respectively transmit different modulation symbols.

If each antenna sends one transmission sequence, a sending mode of the transmission sequence through each antenna is the same as a transmission mode of the LTE PUCCH, thereby ensuring single-carrier transmission through each antenna. The single-carrier transmission has a lower Peak to Average Power Ratio (PAPR), or Cubic Metric (CM), so as to facilitate the design of power amplifiers. Since each antenna sends one modulation symbol, multiple antennas can send multiple modulation symbols simultaneously. In this manner, a spatial multiplexing technology of multiple antennas is employed, so the system capacity is increased.

For example, this mode uses the same condition as assumed in Mode 2. In the implementation, the method for obtaining the transmission sequences and modulation symbols is the same as that in Mode 2. The only difference is that the two obtained sequences are respectively sent through each antenna in this mode.

Figure 8:
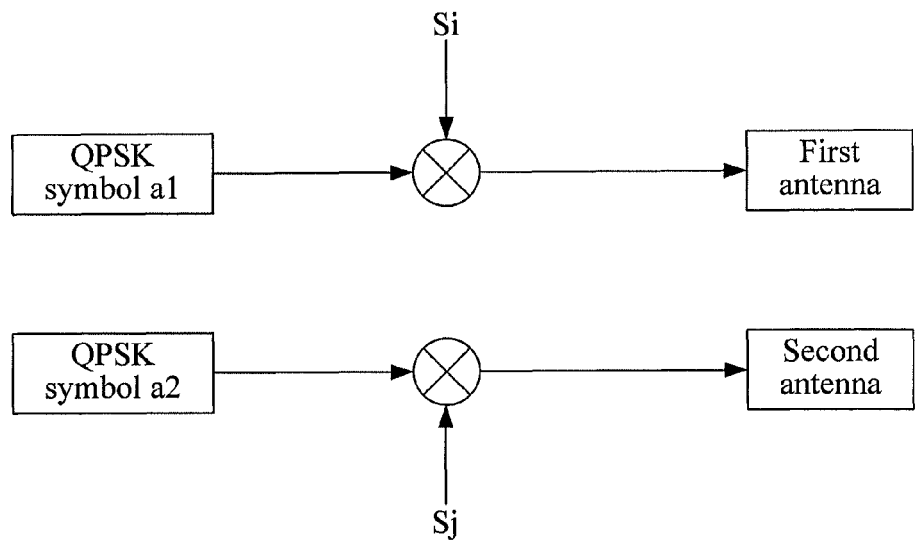
FIG. 8 is a schematic diagram showing the sending of sequences and symbols of a UE according to another embodiment of the present invention.

FIG. 8 is a schematic diagram showing the sending of sequences and symbols according to another embodiment of the present invention. Referring to FIG. 8, a first modulation symbol a1 is mapped to a first transmission sequence Si, and sent through a first antenna; a second modulation symbol a2 is mapped to a first transmission sequence Sj, and sent through a second antenna. Other implementation principles are the same as that in Mode 2, and are not described herein again.

In Mode 4, the UE includes multiple antennas, and each antenna transmits one of multiple received transmission sequences. The multiple sequences transmit the same modulation symbol.

As in Mode 3, each antenna sends one sequence, thereby maintaining the single-carrier transmission; but the same modulation symbol is sent through different antennas, and in this manner, a transmission diversity gain is obtained. In an actual system, the probability that fading occurs to all antenna channels at the same time is very low; therefore, if severe fading occurs to one of the antenna channels, signals from other antennas can compensate for the fading. The transmission diversity can improve the performance of the A/N detection at the BS end. Compared with single-antenna transmission of the LTE system, this mode can obtain better A/N transmission performance, and improve the coverage area of a cell. While obtaining the same performance as the single-antenna transmission, this transmission mode can reduce the transmission power and prolong the terminal standby time of the user.

It is assumed that the system includes 2 antennas and 4 downlink frequency bands for transmitting data to the user, and each downlink frequency band includes two codewords. The PDCCH of the primary downlink frequency band is formed by 4 CCEs. Then 4 sequences are reserved on the primary uplink frequency band (M=4), and the sequences are S1, S2, S3 and S4 respectively. It is assumed that 2 transmission sequences need to be selected (N=2). For the 4 downlink frequency bands, altogether 8 bits of the A/N information exist. In this embodiment, the logic AND operation is performed on the two bits of A/N information in each downlink frequency band, and the bits corresponding to the A/N information that needs to be transmitted in the downlink frequency band is 4 (m=4). The A/N information is A/N(1), A/N(2), A/N(3) and A/N(4) respectively. The bits, of which m=4, are divided into two parts: a first bit group [A/N(1) A/N(2)], of which m1=2, and a second bit group [A/N(3) A/N(4)], of which m2=m−m1=2. The transmission sequences which select N=2 in the reserved sequences are obtained according to the first bit group [A/N (1) A/N (2)], and a modulation symbol is obtained according to the second bit group [A/N (3) A/N (4)]. For the relationship between the first bit group and the transmission sequence, references can be made to Table 6. For the relationship between the second bit group and the modulation symbol (QPSK symbol), references can be made to Table 5.

Figure 9:
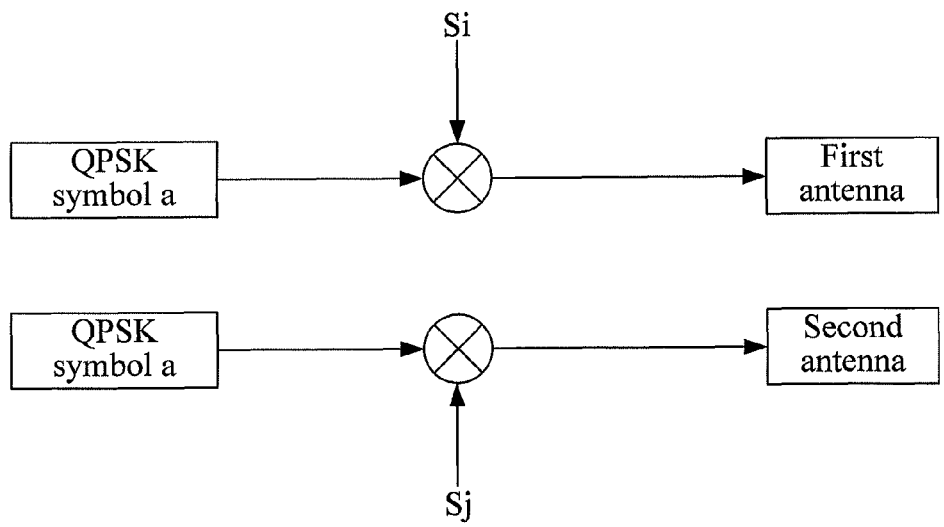
FIG. 9 is a schematic diagram showing the sending of sequences and symbols of a UE according to another embodiment of the present invention.

FIG. 9 is a schematic diagram showing the sending of sequences and symbols according to another embodiment of the present invention. Referring to FIG. 9, after the transmission sequences Si and Sj and a QPSK symbol are obtained through referring to Table 6 and Table 5 according to the bits of the A/N information that needs to be transmitted, the two sequences are sent through two antennas respectively, and the same QPSK symbols are transmitted in the two sequences. For example, for a user, if A/N(1)=1, A/N(2)=0, A/N(3)=1, and A/N(4)=1, the transmission sequences corresponding to [A/N(1),A/N(2)]=[1 0] and obtained according to Table 6 are (S1, S4). The QPSK modulation symbol modulated from [A/N(3),A/N(4)]=[1 1] obtained according to Table 5 is Q3. After that, the modulation symbol Q3 is mapped to the different sequences S1 and S4. Then the two transmission sequences transmitting the same modulation symbol are sent through two antennas. After receiving the feedback signal, the BS performs the detection, and detects that the sequences (S1, S4) include the modulation symbol, and the modulation symbol is Q3. The BS can obtain [A/N(1) A/N(2)]=[1 0], and [A/N(3) A/N(4)]=[1 1] according to the mapping relationship between the transmission sequence and the modulation symbol, and of Table 6 and Table 5. When the A/N is 1, it indicates the correct transmission; when the A/N is 0, it indicates the incorrect transmission. Besides, during the negotiation with the terminal, the BS knows in advance that A/N(1), A/N(2), A/N(3) and A/N(4) respectively correspond to a first downlink frequency band, a second downlink frequency band, a third downlink frequency band, and a fourth downlink frequency band. Therefore, the BS knows whether code words of the second downlink frequency band are transmitted correctly. The BS can re-transmit the code words of the second downlink frequency band only, and does not need to re-transmit code words of all the frequency bands.

For example, in yet another embodiment, 5 downlink frequency bands transmit data to the user, and each downlink frequency band has two codewords. The PDCCH in the main downlink frequency band is formed by 8 CCEs. Then 8 sequences (M=8) are reserved in the primary uplink frequency band, which are S1, S2, S3, S4, S5, S6, S7 and S8 respectively. For 5 downlink frequency bands, 10 bits of A/N exist. If the logic AND operation is performed on the two A/Ns of each downlink frequency band, 5 A/Ns (m=5) are obtained, which are A/N(1), A/N(2), A/N(3), A/N(4) and A/N(5) respectively, and need to be sent to the BS. The 5 bits (m=5) of A/Ns are divided into two groups. Group 1 is [A/N (1) A/N(2) A/N(3)], of which m1=3, and is used for selecting 2 sequences (N=2) Si and Sj from 8 sequences. The relationship of sequence selection is shown in Table 7. Group 2 is [A/N(4) and A/N(5)], of which m2=2, and is used for forming a QPSK modulation symbol; the modulation mapping is shown in Table 5.

TABLE 7

| A/N(1)A/N(2)A/N(3) | (S1, S2) | (S3, S4) | (S5, S6) | (S7, S8) |
|---|---|---|---|---|
| 000 | ✓ | | | |
| 001 | | ✓ | | |
| 010 | | | ✓ | |
| 011 | | | | ✓ |

| A/N(1)A/N(2)A/N(3) | (S1, S3) | (S2, S4) | (S5, S7) | (S6, S8) |
|---|---|---|---|---|
| 100 | ✓ | | | |
| 101 | | ✓ | | |
| 110 | | | ✓ | |
| 111 | | | | ✓ |

If the user has two sending antennas, each antenna sends one sequence, and the two sequences send the same QPSK modulation symbol, as shown in FIG. 9.

For the user, if A/N(1)=0, A/N(2)=1, A/N(3)=1, A/N(4)=0, and A/N(5)=1, then [A/N(1) A/N(2) A/N(3)]=[0 1 1], where [A/N(1) A/N(2) A/N(3)] is used for selecting the sequence; the two sequences selected according to Table 7 are (S7, S8); and [A/N(4) A/N(5)]=[0 1] is modulated to Q1. Then the Q1 is sent through two antennas through the sequences S7 and S8 respectively. Since the same signal is sent through two antennas, the transmission diversity can be obtained.

After receiving the feedback signal, the BS performs the detection. If it is detected that the sequences used are (S7, S8), it can be obtained that [A/N(1) A/N(2) A/N(3)]=[0 1 1]; and if it is detected that the QPSK symbol transmitted on the sequences is Q1, it can be obtained that [A/N(4) A/N(5)]=[0 1]. During the negotiation with the terminal, the BS knows in advance that the A/N(1), A/N(2), A/N(3), A/N(4) and A/N(5) respectively correspond to a first downlink frequency band, a second downlink frequency band, a third downlink frequency band, a fourth downlink frequency band, and a fifth downlink frequency band. Then the BS knows that data in the first downlink frequency band and the fourth frequency band is transmitted incorrectly, and the other data is transmitted correctly. Only two code words of the first frequency band and two code words of the fourth frequency band need to be re-transmitted, and the data of each frequency band does not need to be transmitted.

In Mode 5, the UE has multiple antennas, and the multiple antennas transmit multiple sequences, where at least one antenna transmits at least two transmission sequences. Modulation symbols transmitted in multiple sequences transmitted through one antenna are different.

Figure 10:
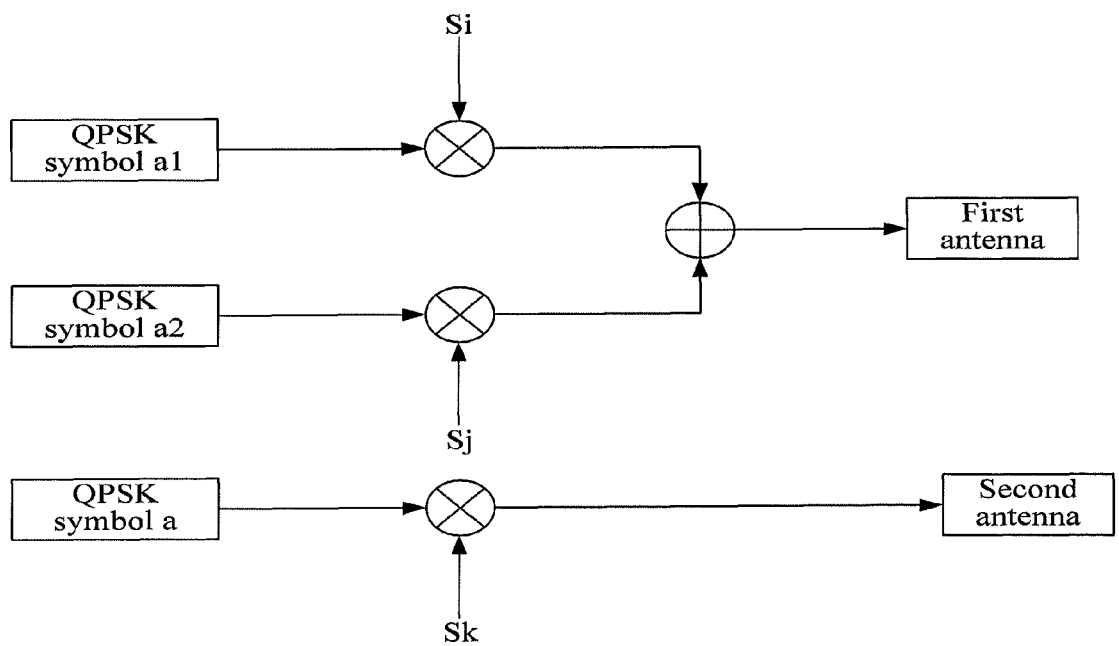
FIG. 10 is a schematic diagram showing the sending of sequences and symbols of a UE according to another embodiment of the present invention.

FIG. 10 is a schematic diagram showing the sending of sequences and symbols according to another embodiment of the present invention. Referring to FIG. 10, it is assumed that the system includes two antennas (a first antenna and a second antenna); the number of transmission sequences that need to be selected is 3, which are Si, Sj and Sk respectively. Si and Sj are transmitted through the same antenna. The modulation symbols corresponding to Si and Sj are a1 and a2 respectively. The modulation symbol corresponding to Sk is a, where a1 is different from a2, and a can be the same as one of a1 and a2, or be different from both. The mode for obtaining a1, a2, Si and Sj, and transmitting a1, a2, Si and Sj through one antenna can be referred to Mode 2; the mode for obtaining a and Sk, and transmitting a and Sk through one antenna can be referred to Mode 1.

For example, 4 downlink frequency bands transmit data to the user, and each downlink frequency band includes two codewords. The PDCCH of the primary downlink frequency band is formed by 4 CCEs. Then 4 sequences (M=4) are reserved on the primary uplink frequency band, which are respectively S1, S2, S3 and S4. It is assumed that the number of the transmission sequences that need to be selected is 3 (N=3). For the 4 downlink frequency bands, 8 bits of A/N information (m=8) exist, which are A/N(1), A/N(2), A/N(3), A/N(4), A/N(5), A/N(6), A/N(7) and A/N(8) respectively. The bits, of which m=8, are divided into two parts: a first bit group [A/N(1) A/N(2)], of which m1=2, and a second bit group [A/N(3) A/N(4) A/N(5) A/N(6) A/N(7) A/N(8)], of which m2=m−m1=6. The transmission sequences which select N=3 in the reserved sequences are obtained according to the first bit group [A/N (1) A/N (2)], and three modulation symbols are obtained according to [A/N (3) A/N (4)], [A/N(5) A/N (6)], and [A/N(7) A/N(8)] of the second bit group. For the relationship between the first bit group and the transmission sequence, references can be made to Table 8; for the relationship between the second bit group and the modulation symbol (QPSK symbol), references can be made to Table 5.

TABLE 8

| A/N(1) A/N(2) | (S1, S2, S3) | (S1, S2, S4) | (S1, S3, S4) | (S2, S3, S4) |
|---|---|---|---|---|
| 00 | ✓ | | | |
| 01 | | ✓ | | |
| 10 | | | ✓ | |
| 11 | | | | ✓ |

For a user, if A/N(1)=1, A/N(2)=0, A/N(3)=1, A/N(4)=1, A/N(5)=1, A/N(6)=0, A/N(7)=0, and A/N(8)=1, then the transmission sequences corresponding to [A/N(1), A/N(2)] =[0 1] obtained according to Table 8 are (S1, S3, S4). The first QPSK modulation symbol a1 obtained according to Table 5 which is modulated from [A/N(3), A/N(4)]=[1 0] is Q3. The second QPSK modulation symbol a2 modulated from [A/N (5), A/N(6)]=[1 0] is Q2. The third QPSK modulation symbol a3 modulated from [A/N(7), A/N(8)]=[0 1] is Q1. After that, the first modulation symbol Q3 is mapped to a first sequence S1, and the second modulation symbol Q2 is mapped to a second sequence S3. The first sequence S1 and the second sequence S3 are added and sent through the same antenna. The third modulation symbol Q1 is mapped to a third sequence S4, and the third sequence S4 is sent through another antenna. After receiving the feedback signal, the BS performs the detection, and detects that the sequences (S1, S3, S4) include the modulation symbols. The modulation symbols are Q3, Q2 and Q1 respectively. The BS can obtain that [A/N(1) A/N(2)]=[1 0], [A/N(3) A/N(4)]=[1 1], [A/N(5), A/N(6)]=[1 0], and [A/N(7),A/N(8)]=[0 1] according to the corresponding relationship between the transmission sequence and the modulation symbol, and of Table 8 and Table 5. When the A/N is 1, it indicates the correct transmission, and when the A/N is 0, it indicates the incorrect transmission. Besides, during negotiation with the terminal, the BS knows in advance that A/N(1), A/N(2), A/N(3), A/N(4), A/N(5), A/N(4), A/N(5), A/N(6), A/N(7) and A/N(8) respectively correspond to a first code word of a first downlink frequency band, a second code word of the first downlink frequency band, a first code word of a second downlink frequency band, a second code word of the second downlink frequency band, a first code word of a third downlink frequency band, a second code word of the third downlink frequency band, a first code word of a fourth downlink frequency band, and a second code word of the fourth downlink frequency band. Therefore, the BS can know that the second code word of the first downlink frequency band, the second code word of the third downlink frequency band, and the first code word of the fourth downlink frequency band are transmitted incorrectly. The BS can re-transmit the first code word of the second downlink frequency band, the second code word of the third downlink frequency band, and the first code word of the fourth downlink frequency band only, and does not need to re-transmit all code words of all frequency bands.

The above modes of selecting m1 and m2 are merely examples. Persons skilled in the art can have other combinations based on the above principles and specific values of M and N. Moreover, the QPSK modulation symbol is used as an example in the above embodiment; the BPSK modulation symbol or a modulation symbol of other modulation orders may also be obtained from the A/N bits.

Figure 11:
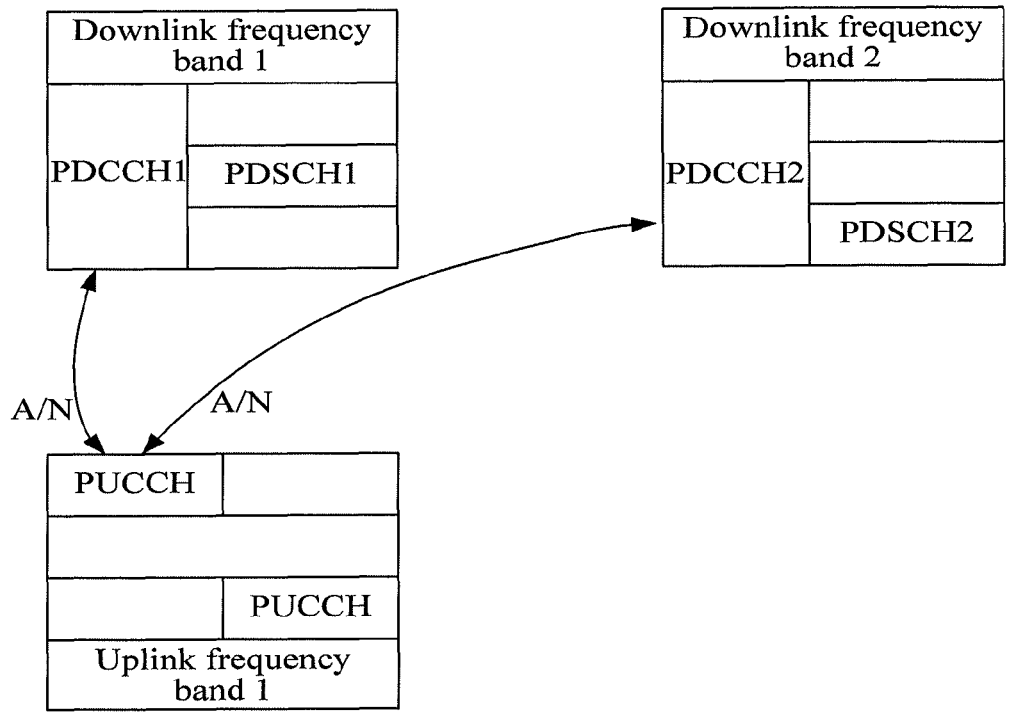
FIG. 11 is a schematic diagram of a mapping relationship between an uplink and a downlink according to another embodiment of the present invention.

The reserved resources in the above embodiments are determined by the CCEs of the PDCCH corresponding to each user in the primary downlink frequency band of the user. Apart from that, another possibility is that the user has the PDCCH in each downlink frequency band; then the A/N resources transmitted on the primary uplink frequency band may also be determined by all PDCCHs. FIG. 11 is a schematic diagram of a mapping relationship between an uplink and a downlink according to another embodiment of the present invention. Referring to FIG. 11, for example, a PDCCH1 in a frequency band 1 is formed by 2 CCEs; and a PDCCH2 in a frequency band 2 is formed by 2 CCEs; then two sequences are reserved in the uplink frequency band for the PDCCH1 and the PDCCH2 respectively, that is, M1=1, and M2=2. Therefore, 4 sequences (M=4) are reserved in the main uplink frequency band. That is to say, the reserved resources are determined according to the CCEs included in the PDCCHs of all the downlink frequency bands corresponding to the user. The number of CCEs included in the PDCCHs of all the downlink frequency bands is used as the number of the reserved resources. After that, the processing method may be any one of the preceding Mode 1 to Mode 5.

For example, 2 downlink frequency bands transmit data to the user, and each downlink frequency band has two codewords. The PDCCH1 of the frequency band 1 is formed by 2 CCEs, and the PDCCH2 of the frequency band 2 is formed by 2 CCEs. Then two sequences are reserved in the uplink frequency band for the PDCCH1 and the PDCCH2 respectively, that is, M1=1, and M2=2. Therefore, 4 sequences (M=M1+M2=4) are reserved in the primary uplink frequency band, which are S1, S2, S3 and S4 respectively. It is assumed that the 2 transmission sequences (N=2) need to be selected. For the 2 downlink frequency bands, the number of bits of the A/N information that needs to be transmitted is 4 (m=4), and the A/N information is A/N (1), A/N (2), A/N (3) and A/N (4) respectively. The 4 bits of the A/N information are all assigned to the first bit group, and the second bit group is empty. The sequences and the modulation symbols are jointly selected according to the 4 bits of A/N information in the first bit group.

TABLE 9

| A/N(1)A/N(2)A/N(3) A/N(4) | Sequence | Modulation symbol |
|---|---|---|
| 0000 | (S1, S2) | $Q_0 = \dfrac{1+j}{\sqrt{2}}$ |
| 0001 | (S2, S3) | $Q_0 = \dfrac{1+j}{\sqrt{2}}$ |
| 0010 | (S3, S4) | $Q_0 = \dfrac{1+j}{\sqrt{2}}$ |
| 0011 | (S1, S4) | $Q_0 = \dfrac{1+j}{\sqrt{2}}$ |
| 0100 | (S1, S2) | $Q_2 = \dfrac{-1+j}{\sqrt{2}}$ |
| 0101 | (S2, S3) | $Q_2 = \dfrac{-1+j}{\sqrt{2}}$ |
| 0110 | (S3, S4) | $Q_2 = \dfrac{-1+j}{\sqrt{2}}$ |
| 0111 | (S1, S4) | $Q_2 = \dfrac{-1+j}{\sqrt{2}}$ |
| 1111 | (S1, S2) | $Q_3 = \dfrac{-1-j}{\sqrt{2}}$ |
| 1000 | (S2, S3) | $Q_3 = \dfrac{-1-j}{\sqrt{2}}$ |
| 1110 | (S3, S4) | $Q_3 = \dfrac{-1-j}{\sqrt{2}}$ |
| 1011 | (S1, S4) | $Q_3 = \dfrac{-1-j}{\sqrt{2}}$ |
| 1001 | (S1, S2) | $Q_1 = \dfrac{1-j}{\sqrt{2}}$ |
| 1100 | (S2, S3) | $Q_1 = \dfrac{1-j}{\sqrt{2}}$ |
| 1010 | (S3, S4) | $Q_1 = \dfrac{1-j}{\sqrt{2}}$ |

TABLE 9-continued

| A/N(1)A/N(2)A/N(3) A/N(4) | Sequence | Modulation symbol |
|---|---|---|
| 1101 | (S1, S4) | $Q_1 = \dfrac{1-j}{\sqrt{2}}$ |

Then the two transmission sequences and modulation symbols are sent through two antennas according to a manner of Mode 4.

If the UE knows the number of the PDCCHs transmitted by the BS in the downlink, and does not correctly detect all the PDCCHs, a DTX needs to be returned. A DTX state affects the way that the transmission sequences are selected in the reserved sequences. Since the reserved resources determined by the UE does not include the reserved resources corresponding to the PDCCHs in accordance with the DTX, the UE can only select the transmission sequences from the reserved resources corresponding to the PDCCHs that are correctly detected. For example, 2 downlink frequency bands transmit data and PDCCHs to the user, and each downlink frequency band has one codeword. The PDCCH1 of the frequency band 1 is formed by 2 CCEs (corresponding to the uplink sequences S1 and S2), and the PDCCH2 of the frequency band 2 is formed by 2 CCEs (corresponding to the uplink sequences S3 and S4). If both PDCCH1 and PDCCH 2 are correctly detected by the UE, the reserved resources determined by the UE in the uplink frequency bands are S1, S2, S3, and S4. If only the PDCCH1 is correctly detected, the reserved resources determined by the UE in the uplink frequency band are S1 and S2. Alternatively, if only the PDCCH2 is correctly detected, the reserved resources determined by the UE in the uplink frequency band are S3 and S4.

If the UE knows that the BS transmits two PDCCHs, and each PDCCH corresponds to one data block, the UE returns for the two data blocks, regardless of whether the PDCCHs are correctly detected or not. In this way, the DTX state exists. For example, feedback for the data block corresponding to the PDCCH1 is ACK, and the feedback for the data block corresponding to PDCCH2 is DTX; then the transmission sequences can only be S1 or/and S2 (determined by the required number of transmission sequences). The sequence selection can be expressed through Table 10 below.

TABLE 10

| A/N(1) | A/N(2) | Sequence | Modulation symbol |
|---|---|---|---|
| 0 | 0 | (S1, S2) | $Q_0 = \dfrac{1+j}{\sqrt{2}}$ |
| 0 | 1 | (S3, S4) | $Q_1 = \dfrac{1-j}{\sqrt{2}}$ |
| 1 | 0 | (S1, S2) | $Q_2 = \dfrac{-1+j}{\sqrt{2}}$ |
| 1 | 1 | (S3, S4) | $Q_0 = \dfrac{1+j}{\sqrt{2}}$ |
| 0 | DTX | (S1, S2) | $Q_1 = \dfrac{1-j}{\sqrt{2}}$ |
| 1 | DTX | (S1, S2) | $Q_3 = \dfrac{-1-j}{\sqrt{2}}$ |

TABLE 10-continued

| A/N(1)A/N(2) | | Sequence | Modulation symbol |
|---|---|---|---|
| DTX | 0 | (S3, S4) | $Q_2 = \dfrac{-1+j}{\sqrt{2}}$ |
| DTX | 1 | (S3, S4) | $Q_3 = \dfrac{-1-j}{\sqrt{2}}$ |
| DTX | DTX | NA | NA |

Then the two transmission sequences and modulation symbols are sent through two antennas according to a manner of Mode 4.

In addition, the preceding illustration and embodiments are all based on the assumption that the reserved resources are in the primary uplink frequency band. Besides, the reserved resources may also be in multiple uplink frequency bands. For a certain user, if three downlink frequency bands exist in the downlink, and two uplink frequency bands exist in the uplink, M1 and M2 resources are reserved in each uplink frequency band respectively, and the user altogether reserves (M1+M2) resources. The transmission resources for transmitting the A/N of the user may be selected from the reserved (M1+M2) resources.

Moreover, the above embodiments are all based on the assumption that the reserved resources are indirectly obtained through the PDCCHs in the primary downlink frequency band or multiple downlink frequency bands; however, the reserved resources may also be assigned through the explicit signaling, or jointly obtained through the indirect PDCCHs and the explicit signaling.

In the embodiments of the present invention, the bits of the A/N information that needs to be transmitted are divided into the first bit group and the second bit group. The transmission resources are obtained according to the first bit group, and the corresponding modulation symbols are obtained according to the second bit group, so that the BS can determine whether each data block is transmitted correctly or not.

Specifically, further, the second bit group can be empty; the transmission resources and the modulation symbols can be obtained through the first bit group only.

Persons of ordinary skill in the art should understand that, all or a part of the steps of the method according to the embodiments may be implemented by a program instructing relevant hardware. The program may be stored in a computer readable storage medium. When the program is executed, the steps of the method according to the embodiments are performed. The storage medium may be any medium capable of storing program codes, such as a read-only memory (ROM), a random access memory (RAM), a magnetic disk or an optical disk.

Figure 12:
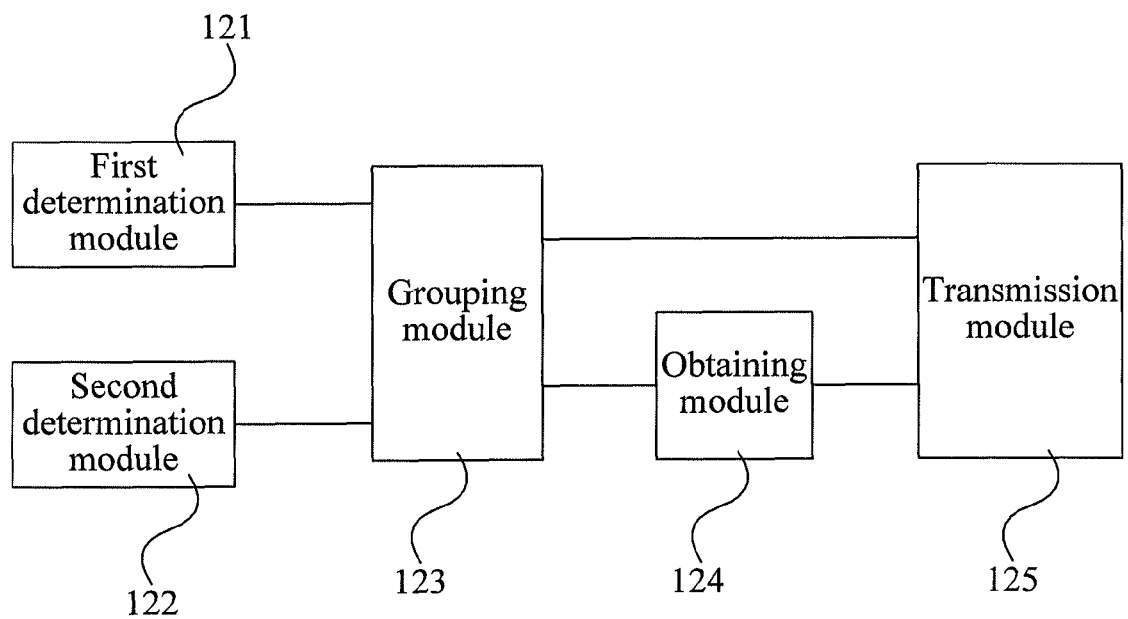
FIG. 12 is a schematic structural diagram of a UE according to another embodiment of the present invention.
Figure 13:
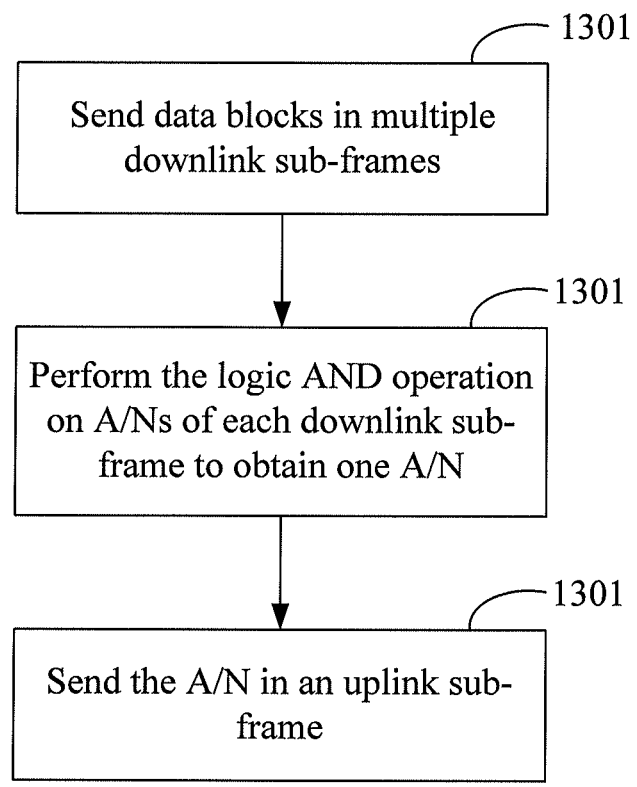
FIG. 13 is a method for transmitting multiple pieces of A/N information in the prior art.

FIG. 12 is a schematic structure diagram of a UE according to another embodiment of the present invention. The UE includes a first determination module 121, a second determination module 122, a grouping module 123, an obtaining module 124 and a transmission module 125. The first determination module 121 is configured to determine reserved resources. The second determination module is configured to determine A/N information that needs to be transmitted. The grouping module 123 is connected to the first determination module 121 and the second determination module 122, and is configured to divide the A/N information that needs to be transmitted into a first bit group and a second bit group according to the number of the reserved resources, and determine that the number of transmission resources is N. The obtaining module 124 is connected to the grouping module 123, and is configured to obtain the N transmission resources from the reserved resources according to the first bit group, and obtain corresponding modulation symbols according to the second bit group. The transmission module 125 is connected to the grouping module 123 and the obtaining module 124, and is configured to transmit the obtained modulation symbols by using the obtained transmission resources. The number of bits of the first bit group obtained by the grouping module 123 is m1, which needs to meet $2^{m1} \leq C_M^N$, where M is the number of the reserved resources, and N is the number of the transmission resources.

Specifically, further, the second bit group can be empty; the N transmission resources and the modulation symbols can be obtained through the first bit group only. That is to say, the obtaining module 124 obtains N transmission resources and the corresponding modulation symbols from the reserved resources according to the first bit group.

In this embodiment, the bits of the A/N information that needs to be transmitted are divided into the first bit group and the second bit group. The transmission resources are obtained according to the first bit group, and the modulation symbols are obtained according to the second bit group, so that each bit can affect the information in the uplink frequency band; therefore BS can determine whether each data block is transmitted correctly.

Specifically, the second bit group can be empty; the transmission resources and the modulation symbols can be obtained through the first bit group only.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications or equivalent replacements can still be made to the technical solutions of the present invention, as long as such modifications or replacements do not depart from the spirit and scope of the present invention.

What is claimed is:

1. A method for transmitting multiple acknowledgement/negative acknowledgement (A/N) information in a communication system, comprising:
   determining reserved resources;
   determining A/N information that needs to be transmitted;
   selecting N transmission resources out of the reserved resources and at least one modulation symbol according to a number of the reserved resources and according to the A/N information that needs to be transmitted such that the A/N information is mapped to a selection of the selected N transmission resources and a selection of the at least one modulation symbol, wherein N is an integer greater than or equal to 2; and
   transmitting the at least one modulation symbol using the transmission resources.

2. The method according to claim 1, wherein the selecting of the N transmission resources and the at least one modulation symbol according to a number of the reserved resources and according to the A/N information that needs to be transmitted comprises:
   dividing the A/N information that needs to be transmitted into a first bit group and a second bit group according to a number of the reserved resources, and determining that the number of the transmission resources is N; and selecting the N transmission resources out of the reserved resources according to the first bit group, and selecting the at least one modulation symbol according to the second bit group.

3. The method according to claim 1, wherein the selecting of the N transmission resources and the at least one modulation symbol according to a number of the reserved resources and according to the A/N information that needs to be transmitted comprises:
jointly selecting the N transmission resources and the at least one modulation symbol according to a number of the reserved resources and according to the A/N information that needs to be transmitted.

4. The method according to claim 1, wherein the determining of the reserved resources comprises: determining the reserved resources according to Control Channel Elements (CCEs) comprised in Physical Downlink Control Channels (PDCCHs) in all downlink frequency bands.

5. The method according to claim 1, wherein the reserved resources are explicitly assigned by a base station (BS).

6. The method according to claim 1, wherein the reserved resources comprises resources explicitly assigned by a BS and resources determined according to Control Channel Elements (CCEs) which are comprised in Physical Downlink Control Channels (PDCCHs) in a primary downlink frequency band.

7. The method according to claim 1, wherein the at least one modulation symbol is transmitted using the transmission resources through multiple antennas, each of the multiple antennas sends one of the transmission resources, and each of the transmission resources conveys the same modulation symbol or different modulation symbols.

8. The method according to claim 1, wherein the reserved resources are any of the following: time, frequencies, codes, sequences, and antennas.

9. The method according to claim 1, wherein the A/N information comprises any one or any combination of the following: acknowledgement (ACK) information, negative acknowledgement (NACK) information and Discontinuous Transmission (DTX) state information.

10. A user equipment (UE), comprising:
a module, configured to determine reserved resources;
a module, configured to determine acknowledgement/negative acknowledgement (A/N) information that needs to be transmitted;
a module, configured to jointly select N transmission resources out of the reserved resources and at least one modulation symbol according to a number of the reserved resources and according to the A/N information that needs to be transmitted such that the A/N information is mapped to a selection of the selected N transmission resources and a selection of the at least one modulation symbol, wherein N is an integer greater than or equal to 2; and
a module, configured to transmit the at least one modulation symbol using the transmission resources.

11. The UE according to claim 10, wherein the at least one modulation symbol is transmitted by using the transmission resources through multiple antennas, each of the multiple antennas sending one of the transmission resources, and each of the transmission resources conveys the same modulation symbol or different modulation symbols.

12. The UE according to claim 10, wherein the reserved resources are any of the following: time, frequencies, codes, sequences, and antennas.

13. The UE according to claim 10, wherein the A/N information comprises any one or any combination of the following: acknowledgement (ACK) information, negative acknowledgement (HACK) information and Discontinuous Transmission (DTX) state information.

14. A user equipment (UE), comprising at least one digital microprocessor configured to:
determine reserved resources;
determine acknowledgement/negative acknowledgement (A/N) information that needs to be transmitted;
select N transmission resources out of the reserved resources and at least one modulation symbol according to a number of the reserved resources and according to the A/N information that needs to be transmitted such that the A/N information is mapped to a selection of the selected N transmission resources and a selection of the at least one modulation symbol, wherein N is an integer greater than or equal to 2; and
transmit the at least one modulation symbol using the transmission resources.

15. The UE according to claim 14, wherein the N transmission resources and the at least one modulation symbol are jointly selected according to a number of the reserved resources and according to the A/N information that needs to be transmitted.

16. The UE according to claim 14, wherein the reserved resources are determined according to Control Channel Elements (CCEs) comprised in Physical Downlink Control Channels (PDCCHs) in all downlink frequency bands.

17. The UE according to claim 14, wherein the reserved resources comprises resources explicitly assigned by a base station and resources determined according to Control Channel Elements (CCEs) comprised in Physical Downlink Control Channels (PDCCHs) in a primary downlink frequency band.

18. The UE according to claim 14, wherein the at least one modulation symbol is transmitted using the transmission resources through multiple antennas, each antenna sending one of the multiple transmission resources, and each of the transmission resources conveys the same modulation symbol or different modulation symbols.

19. The UE according to claim 14, wherein the reserved resources are any of the following: time, frequencies, codes, sequences, and antennas.

20. The UE according to claim 14, wherein the A/N information comprises one or any combination of the following: acknowledgement (ACK) information, negative acknowledgement (NACK) information and Discontinuous Transmission (DTX) state information.

21. A chip which is used in a user equipment (UE), comprising:
a module, configured to determine reserved resources;
a module, configured to determine acknowledgement/negative acknowledgement (A/N) information that needs to be transmitted;
a module, configured to jointly select N transmission resources out of the reserved resources and at least one modulation symbol according to a number of the reserved resources and according to the A/N information that needs to be transmitted such that the A/N information is mapped to a selection of the selected N transmission resources and a selection of the at least one modulation symbol, wherein N is an integer greater than or equal to 2; and
a module, configured to transmit the at least one modulation symbol using the transmission resources.

22. The chip according to claim 21, wherein the reserved resources are determined according to Control Channel Elements (CCEs) comprised in Physical Downlink Control Channels (PDCCHs) in all downlink frequency bands.

23. The chip according to claim 21, wherein the reserved resources comprises resources explicitly assigned by a base station and resources determined according to Control Channel Elements (CCEs) comprised in Physical Downlink Control Channels (PDCCHs) in a primary downlink frequency band.

24. The chip according to claim 21, wherein the at least one modulation symbol is transmitted using the transmission resources through multiple antennas, each antenna sending one of the multiple transmission resources, and each of the transmission resources conveys the same modulation symbol or different modulation symbols.

25. The chip according to claim 21, wherein the reserved resources are any of the following: time, frequencies, codes, sequences, and antennas.

26. The chip according to claim 21, wherein the A/N information comprises one or any combination of the following: acknowledgement (ACK) information, negative acknowledgement (NACK) information and Discontinuous Transmission (DTX) state information.

27. A wireless communication system comprising a Base Station (BS) in communication with a user equipment (UE), wherein
  the BS is configured to send a data block and control information related to the data block to the UE; and
  the UE is configured to:
  detect the data block and the control information;
  determine reserved resources;
  determine acknowledgement/negative acknowledgement (A/N) information that needs to be transmitted;
  select N transmission resources out of the reserved resources and at least one modulation symbol according to a number of the reserved resources and according to the A/N information that needs to be transmitted such that the A/N information is mapped to a selection of the selected N transmission resources and a selection of the at least one modulation symbol, wherein N is an integer greater than or equal to 2; and
  transmit the at least one modulation symbol to the BS using the transmission resources.

\* \* \* \* \*